US012565022B2

(12) United States Patent　(10) Patent No.:　US 12,565,022 B2

Conway　(45) Date of Patent:　Mar. 3, 2026

(54) INSULATIVE MATERIAL

(71) Applicant: eXclaim IP, LLC, Cornelius, NC (US)

(72) Inventor: Kevin Conway, Cornelius, NC (US)

(73) Assignee: eXclaim IP, LLC, Cornelius, NC (US)

( * ) Notice: Subject to any disclaimer, the term of this patent is extended or adjusted under 35 U.S.C. 154(b) by 96 days.

(21) Appl. No.: 18/233,630

(22) Filed: Aug. 14, 2023

(65) Prior Publication Data

US 2023/0382080 A1　Nov. 30, 2023

Related U.S. Application Data

(63) Continuation-in-part of application No. 17/346,235, filed on Jun. 12, 2021, now Pat. No. 11,724,478, which is a continuation of application No. 17/226,684, filed on Apr. 9, 2021, now Pat. No. 11,858,246, which is a continuation of application No. 16/844,990, filed on Apr. 9, 2020, now Pat. No. 11,254,091, which is a continuation-in-part of application No. 15/820,289, filed on Nov. 21, 2017, now Pat. No. 10,669,090.

(60) Provisional application No. 62/492,382, filed on May 1, 2017, provisional application No. 62/492,386, filed on May 1, 2017, provisional application No. 62/460,946, filed on Feb. 20, 2017, provisional (Continued)

(51) Int. Cl.

| | |
|---|---|
| *B32B 5/24* | (2006.01) |
| *B32B 1/00* | (2006.01) |
| *B32B 5/02* | (2006.01) |
| *B32B 5/18* | (2006.01) |
| *B32B 27/06* | (2006.01) |
| *B32B 27/34* | (2006.01) |
| *B32B 27/36* | (2006.01) |

(52) U.S. Cl.

CPC ............... *B32B 5/245* (2013.01); *B32B 1/00* (2013.01); *B32B 5/02* (2013.01); *B32B 5/18* (2013.01); *B32B 27/065* (2013.01); *B32B 27/34* (2013.01); *B32B 27/36* (2013.01); *B32B 2255/10* (2013.01); *B32B 2262/0276* (2013.01); *B32B 2307/71* (2013.01); *B32B 2307/73* (2013.01)

(58) Field of Classification Search

CPC .. B32B 5/245; B32B 1/00; B32B 5/02; B32B 5/18; B32B 27/065; B32B 27/34; B32B 27/36; B32B 2255/10; B32B 2262/0276; B32B 2307/71; B32B 2307/73

USPC ...................................................... 428/32.77

See application file for complete search history.

(56) References Cited

U.S. PATENT DOCUMENTS

| | | | | |
|---|---|---|---|---|
| 2,588,067 A | * | 3/1952 | Whitehead ........... | B42D 25/415 156/308.2 |
| 6,226,820 B1 | * | 5/2001 | Navarro ............... | A47C 27/088 5/655.4 |

(Continued)

*Primary Examiner* — Betelhem Shewareged

(74) *Attorney, Agent, or Firm* — Woods Rogers Vandeventer Black PLC; Nathan A. Evans

(57) ABSTRACT

A thermally insulating material comprising at least three layers, wherein the first layer comprises a metalized material capable of reflecting thermal radiation, wherein the second layer comprises a foam, an ultra-low thermally conductive material, a phase change material, or a combination thereof, and wherein the third layer (or a fourth layer) comprises a woven or non-woven material and includes at least one conductive material prohibiting transmission of electronic transmissions. In aspects, the metalized layer reflects thermal radiation away from a covered electronic component or device.

31 Claims, 3 Drawing Sheets

Related U.S. Application Data application No. 62/460,943, filed on Feb. 20, 2017, provisional application No. 62/424,579, filed on Nov. 21, 2016.

(56)                    References Cited

U.S. PATENT DOCUMENTS

| | | | | |
|---|---|---|---|---|
| 8,827,129 | B2* | 9/2014 | Youssefi-Shams ... | G06F 1/1628 224/676 |
| 2001/0036520 | A1* | 11/2001 | Hall ......................... | B32B 5/18 428/35.5 |
| 2004/0221360 | A1* | 11/2004 | Wood ................... | A41D 13/012 2/69 |
| 2004/0245303 | A1* | 12/2004 | Santayana ............... | B60R 11/00 224/482 |
| 2005/0115848 | A1* | 6/2005 | Tauchen ................... | A45C 3/00 206/315.1 |
| 2007/0228099 | A1* | 10/2007 | Beda ...................... | A45C 11/00 224/666 |
| 2008/0017678 | A1* | 1/2008 | Anderson ............... | A44C 5/003 224/236 |
| 2010/0003491 | A1* | 1/2010 | Crostic, Jr. ............. | B32B 27/36 428/424.8 |
| 2011/0262699 | A1* | 10/2011 | Yializis ................. | B32B 29/002 442/379 |
| 2012/0061134 | A1* | 3/2012 | Kennedy ................. | D02G 3/12 174/388 |
| 2014/0008945 | A1* | 1/2014 | Widmann ............... | A47C 7/746 297/180.11 |
| 2014/0197049 | A1* | 7/2014 | Napolitano ............... | A45F 5/02 206/45.24 |
| 2014/0228649 | A1* | 8/2014 | Rayner ................ | A61B 5/0002 600/595 |
| 2014/0260111 | A1* | 9/2014 | Phillips .................... | F25D 3/08 62/457.7 |
| 2014/0305524 | A1* | 10/2014 | Heizer ...................... | F17D 1/08 137/551 |
| 2015/0052617 | A1* | 2/2015 | Zar ....................... | H04B 1/3888 726/27 |
| 2018/0115338 | A1* | 4/2018 | Hermanowski ...... | H04B 1/3888 |
| 2023/0382080 | A1* | 11/2023 | Conway ................. | A45C 11/00 |

* cited by examiner

204

201

202

203

INSULATIVE MATERIAL

CROSS-REFERENCE TO RELATED APPLICATIONS

The present application is a continuation-in-part of and claims priority to U.S. application Ser. No. 17/346,235, filed Jun. 12, 2021, which is a continuation of and relies on the disclosures of and claims priority to and the benefit of the filing dates of U.S. Non-Provisional application Ser. No. 17/226,684, filed Apr. 9, 2021, which relies on the disclosures of and claims priority to and the benefit of the filing dates of U.S. Non-Provisional application Ser. No. 16/844, 990, filed Apr. 9, 2020, which relies on the disclosures of and claims priority to and the benefit of the filing dates of U.S. Non-Provisional application Ser. No. 15/820,289, filed Nov. 21, 2017, which relies on the disclosures of and claims priority to and the benefit of the filing dates of U.S. Provisional Application No. 62/424,579, filed Nov. 21, 2016, U.S. Provisional Application Nos. 62/460,946 and 62/460,943, filed Feb. 20, 2017, U.S. Provisional Application Nos. 62/492,382 and 62/492,386, filed May 1, 2017. The disclosures of each of these applications are hereby incorporated by reference herein in their entireties.

BACKGROUND OF THE INVENTION

Field of the Invention

An object of the present invention is a thermally insulating material comprising at least three layers, wherein the first layer comprises a metalized material capable of reflecting thermal radiation, wherein the second layer comprises a foam, an ultra-low thermally conductive material, a phase change material, or a combination thereof, and wherein the third layer comprises a woven or non-woven material. In aspects, the metalized layer reflects thermal radiation away from a covered electronic component or device. In aspects, the thermally insulating material is to cover, hold, carry, encase, secure, locate, or otherwise relate to insulation regarding a battery and other electronic components including a computer processing unit (CPU).

Although advantages such as high energy density, less pollution, stable performance, and long cycling life have made lithium-ion batteries (LIBs) the dominant power source for applications ranging from portable electronics to electric vehicles (EVs), challenges also remain. Generally, the working environments of LIBs are complex, where extreme conditions, such as external forces, high temperature, low temperature, overcharge, and over-discharge, etc., are usually involved. Among these, low temperature conditions cause significant loss of battery power and accelerate the decay rate, which dramatically limits the driving range and hinders the expansion of EVs. Both extreme cold and heat can significantly reduce the life of the battery charge.

An object of the current invention is an insulating material to resolve some or all of the issues affecting some or all of the issues pertaining to batteries in the above paragraph and/or as described herein.

Description of Related Art

There is a need to find a better insulation material for batteries used in, for example, portable electronic devices and electric vehicles. Such an insulation material should provide protection both in hot and cold environments, such as extreme heat and extreme cold environments.

An inadequate solution is found in U.S. Pat. No. 9,460, 309 disclosing a security pouch for an electronic device. This pouch uses eight layers, with the innermost layer being a liner material, layers two through five being metal shielding material, the sixth layer can be RFID/NFC shielding, the seventh layer is a thin foam, and the outer layer is vinyl, leather, or canvas. While this solution seeks to prevent signal passage, this solution can suffer from existing problems associated with providing protection in both hot and cold environments.

SUMMARY OF THE INVENTION

The invention disclosed herein is that of a novel insulative (insulating) material that, in aspects, can provide thermal protection in both heat and cold environments. In certain embodiments this highly insulative material is fabricated as a stacked layered material and in other embodiments this highly insulative material can be fabricated as a composite layered material. This novel highly insulative material can be assembled in rolls or sheets.

In an embodiment, the invention consists of three layers. The outermost layer can be comprised of one, two, three, or more sub-layers. The outermost layer can be that of a metalized layer. The metalized layer can be comprised of, by way of example only, a reflective polyethylene terephthalate (PET) film (Mylar™). The metalized layer can be designed to reflect thermal radiant radiation. While the embodiments herein show that that outer layer #1 is a metalized layer, in certain embodiments this outermost metalized layer can optionally be laminated to a nylon sub-layer. The nylon material can be that of a Rip Stop Nylon. In addition, in certain embodiments the metalized layer can be covered with a colored fabric sub-layer. In cases, the reflective layer reflects thermal radiation away from the electronic device, such as a battery, and back towards an outside environment or outside heat source, such as the sun. In still another embodiment, the nylon sub-layer can be surrounded on both sides with the metalized layer such that thermal radiation is reflected in both directions, away from the covered electronic device or component and towards the covered electronic device or component. In an embodiment, the nylon sublayer can be partially or completely covered on both sides by a metalized layer. In aspects the metalized layer can reflect in both directions, away from the covered electronic device or component and towards the covered electronic device or component.

The second layer, in embodiments, comprises an Ultra-Low Thermally Conductive Material (by way of example only, Aerogel). In other embodiments, the second layer comprises of an open cell foam, a closed cell foam, or combinations thereof. In still other embodiments, the second layer comprises a PCM (phase change) material.

The third major layer can comprise a woven or non-woven material. In embodiments, the third layer comprises a fire retardant woven or non-woven material. Such materials can be, by way of example only, Twaron, Nomex, Coated Nylon, Carbon Foam, Pyromex, Pyrovatex fr cotton, Dale Antiflame, Indura fr cotton, TEchnora, Teijinconex, Lenzing fire retardant rayon, Carbon X, Kanox, Mazic, Modacrylic, Kermel, and/or PBI. In embodiments, the fire-retardant material can be fabricated to allow for breathability through the material.

In further embodiments, the third layer can include one or more conductive materials associated with or integrated within the woven or non-woven material. The conductive materials can block electronic transmissions, including but not limited to electromagnetic fields, electronic waves, and wireless signals. In varying embodiments, the conductive material can be copper, nickel, and aluminum or any other suitable conductive material as recognized by a skilled artisan. In another embodiment, the conductive material can include a series of thin metallic wires for blocking electronic waves. The filaments can be composed of copper, silver, nickel, galvanized zinc, iron, aluminum, stainless steel, and/or a combination thereof. The filaments can block wireless transmissions, including if a mobile device is encased within the thermally insulative material, including blocking one or more radio frequency signal(s), Wi-Fi signals, Bluetooth signal(s), global positioning signal(s), among others. In a further embodiment, the third layer can be impregnated with or coated with MXenes. In a further embodiment, the third layer further can include at least one of: two-dimensional transition metal carbides, carbonitrides, and nitrides. In other aspects of the current invention, instead of these one or more blocking elements in the third layer, they can be included in a fourth layer.

BRIEF DESCRIPTION OF THE DRAWINGS

The accompanying drawings illustrate certain aspects of some of the embodiments of the present invention, and should not be used to limit or define the invention. Together with the written description the drawings serve to explain certain principles of the invention.

DETAILED DESCRIPTION OF VARIOUS EMBODIMENTS OF THE INVENTION

Reference will now be made in detail to various exemplary embodiments of the invention. It is to be understood that the following discussion of exemplary embodiments is not intended as a limitation on the invention. Rather, the following discussion is provided to give the reader a more detailed understanding of certain aspects and features of the invention.

By way of example, the following are potential embodiments showing possible layers of the invention.

Figure 1:
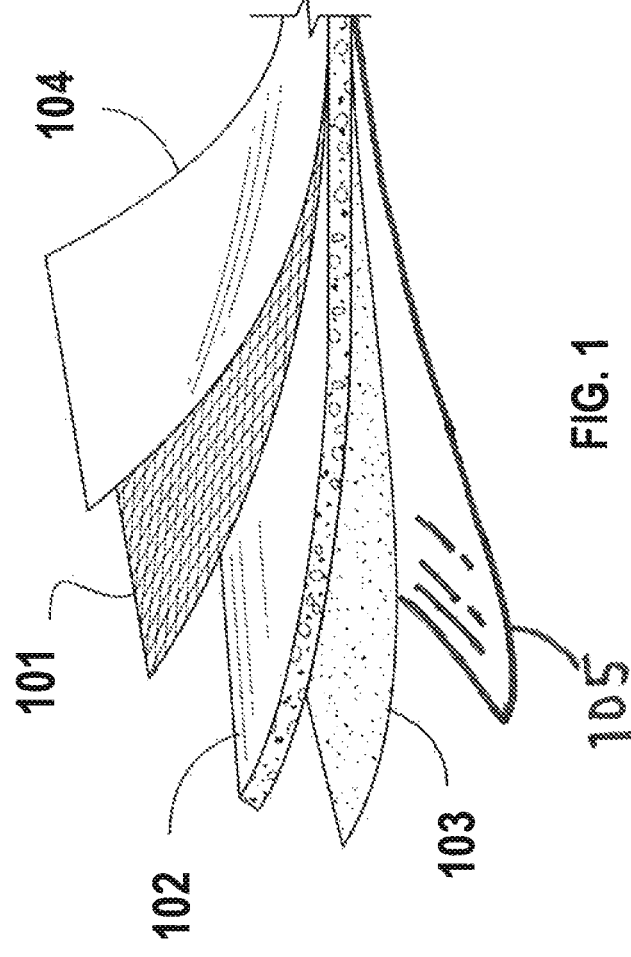
FIG. 1 is a schematic diagram of a depiction of one possible embodiment of an insulative material as described herein.

Embodiment #1 (FIG. 1)

Layer 1—Metalized Layer 101 (Radiant Barrier) (Layer 1 can optionally be covered with a colored fabric 104)
Layer 2—Low or Ultra Low Thermally Conductive Material 102 (by way of example, Aerogel)
Layer 3—Woven or non-woven material 103 (Layer 3 can optionally be flame retardant fabric)
Optional Layer 4—Conductive material can be integrated within optional layer 105, as explained herein.

Figure 2:
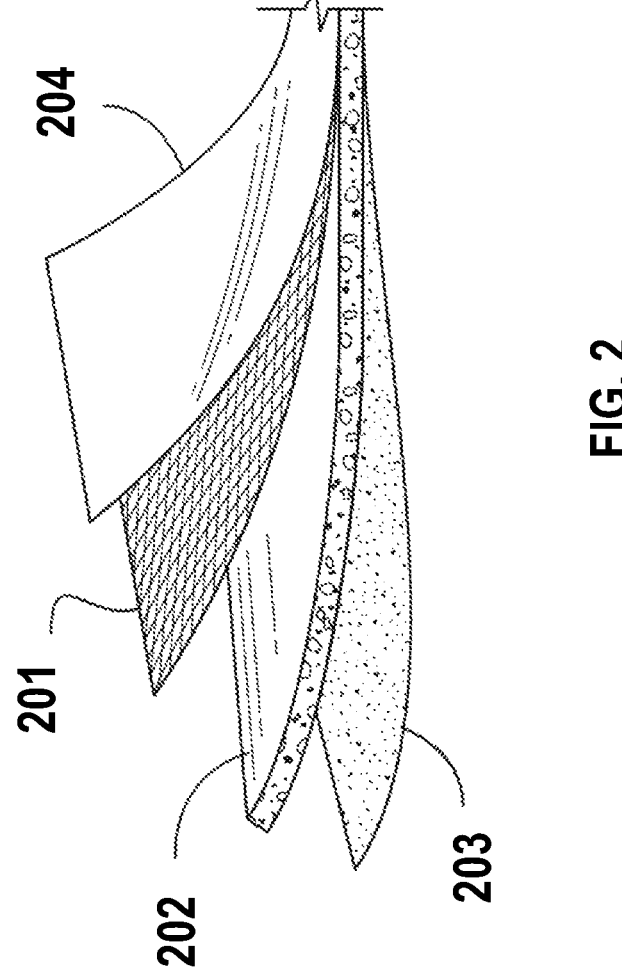
FIG. 2 is a schematic diagram of a depiction of one possible embodiment of an insulative material as described herein.

Embodiment #2 (FIG. 2)

Layer 1—Metalized Layer 201 (Radiant Barrier) (Layer 1 can optionally be covered with a colored fabric 204)
Layer 2—Foam 202 (open, closed)

Layer 3—Woven or non-woven material 203 (Layer 3 can optionally be flame retardant fabric)

Figure 3:
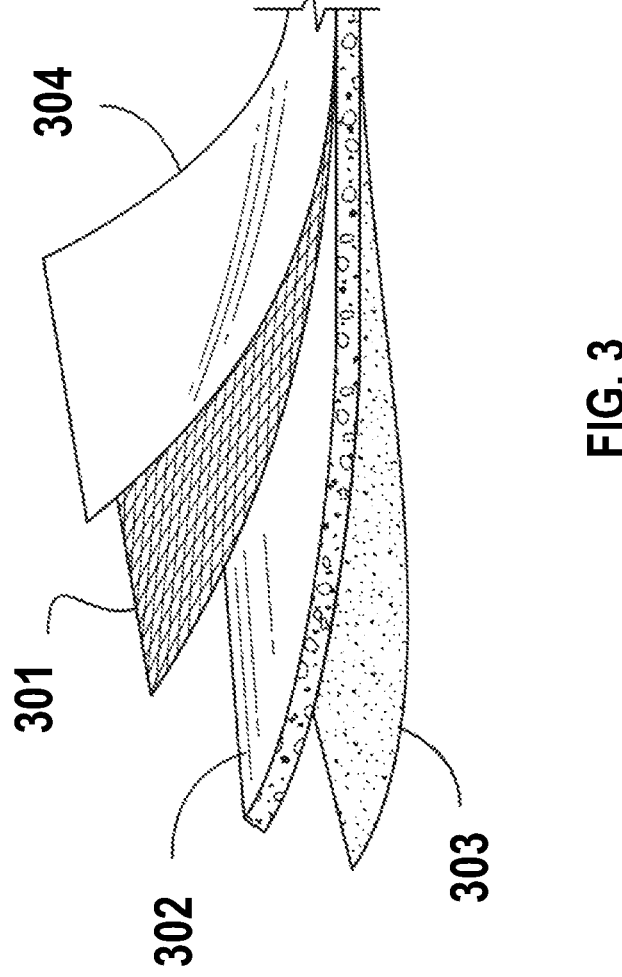
FIG. 3 is a schematic diagram of a depiction of one possible embodiment of an insulative material as described herein.

Embodiment #3 (FIG. 3)

Layer 1—Metalized Layer 301 (Radiant Barrier) (Layer 1 can optionally be covered with a colored fabric 304)
Layer 2—Phase change material (PCM) 302 (for example, a substance that is capable of absorbing and/or releasing thermal energy during a process of melting and/or freezing)
Layer 3—Woven or non-woven material 303 (Layer 3 can optionally be flame retardant fabric)

In aspects, the radiant barrier layer can be applied as a vapor deposition coating to the second layer. In aspects, the vapor deposition coating is a metallic vapor deposition coating.

In aspects, the layers are attached, joined, or connected using one or a combination of two or more of the following: chemical adhesion, thermal adhesion, a mechanical mechanism or means (such as, by way of example only, stitching), lamination, or joining using heat and pressure.

Other embodiments comprise a thermally insulative material, wherein the thermally insulative material comprises three layers, wherein the first layer comprises a metalized material capable of reflecting thermal radiation, wherein the second layer comprises a foam, ultra-low thermally conductive material, phase change material, or a combination thereof, and wherein the third layer comprises a woven or non-woven material, and wherein the metalized layer reflects thermal radiation away from a covered electronic component or device. The first layer can be comprised of one, two, or three sub-layers. The first layer can be comprised of a metalized material and a nylon material. The nylon material can be surrounded by or completely or partially covered by the metalized material. The nylon material can be attached to the metalized material on one side or both sides. The second layer can be comprised of an insulative material. The third layer can be comprised of a woven or non-woven material. The non-woven or woven material can be a fabric. The woven or non-woven material can be fire-retardant. The metalized layer, in aspects, comprises biaxially-oriented polyethylene terephthalate, Mylar™, Melinex™ Hostaphan™, or a combination thereof. The metalized layer can be laminated to nylon. The ultra-low thermally conductive material can be Aerogel. The foam can be an open cell foam. The foam can be a closed cell foam. The thermally insulative material can be capable of insulating a mobile electronic device. The thermally insulative material can be capable of insulating a battery. The thermally insulative material can be capable of insulating a computer or computerized device. The thermally insulative material can be capable of insulating an electronic component. The thermally insulative material can be an arranged and attached stack of layers. The thermally insulative material can be a composite layered material. The thermally insulative material can reflect thermal radiation away from a covered electronic device or component. The thermally insulative material can reflect thermal radiation towards a covered electronic device or component. The thermally insulative material can reflect thermal radiation away from and towards a covered electronic device or component.

The thermally insulative material can be configured as or form a pouch, enclosure, case, pocket, container, and/or receptacle. The thermally insulative material can used in or on a garment.

In a further embodiment, the third layer, such as layer 103 of FIG. 1, can include at least one conductive material. The conductive material can be integrated within the woven or non-woven material 103, disposed on a top side between layer 103 and layer 102, or disposed on a bottom side of the layer 103. In aspects, the conductive material can be included in or on a fourth layer 105, or the conductive material can be integrated within layer 105, disposed on a top side between layer 105 and layer 103, or disposed on a bottom side of the layer 105. In aspects, the conductive material can be included in or on the third 103 and fourth 105 layers, as explained above. The inclusion of at least one conductive material provides for electrical shielding prohibiting electronic transmissions passing across the layer. Wherein the material encases an electronic device, the electrical shield safeguards the mobile device from electrical interference. Electrical transmissions can include electromagnetic fields, electronic waves, electronic signals, among others. The conductive material can block the passage of the electromagnetic fields, the electronic waves including radio frequency signals, the electronic signals, including for example WiFi signals, global positioning system (GPS) signals, and Bluetooth signals.

In addition to conductive materials, additional embodiments can include inclusion or treatment with two-dimensional inorganic compounds with atomically thin layers of transition metal carbides, nitrides, and/or carbonitrides. In an embodiment, the conductive materials can further include MXenes, providing electromagnetic interference shielding. These embodiments further benefit from the flexibility and malleability of the MXenes or other transition metal carbides, nitrides, and/or carbonitrides within the structure of the thermally insulative material as noted herein.

The present invention has been described with reference to particular embodiments having various features. In light of the disclosure provided above, it will be apparent to those skilled in the art that various modifications and variations can be made in the practice of the present invention without departing from the scope or spirit of the invention. One skilled in the art will recognize that the disclosed features may be used singularly, in any combination, or omitted based on the requirements and specifications of a given application or design. When an embodiment refers to "comprising" certain features, it is to be understood that the embodiments can alternatively "consist of" or "consist essentially of" any one or more of the features. Other embodiments of the invention will be apparent to those skilled in the art from consideration of the specification and practice of the invention.

It is noted in particular that where a range of values is provided in this specification, each value between the upper and lower limits of that range is also specifically disclosed. The upper and lower limits of these smaller ranges may independently be included or excluded in the range as well. The singular forms "a," "an," and "the" include plural referents unless the context clearly dictates otherwise. It is intended that the specification and examples be considered as exemplary in nature and that variations that do not depart from the essence of the invention fall within the scope of the invention. Further, all of the references cited in this disclosure are each individually incorporated by reference herein in their entireties and as such are intended to provide an efficient way of supplementing the enabling disclosure of this invention as well as provide background detailing the level of ordinary skill in the art.

The invention claimed is:

1. A thermally insulative material comprising:
   a first layer comprising a metalized material capable of reflecting thermal radiation;
   a second layer comprising a foam, an ultra-low thermally conductive material, a phase change material, or a combination thereof; and
   a third layer comprising a woven or non-woven material;
   wherein the first layer reflects thermal radiation away from an electronic component or device completely or partially covered by the thermally insulative material;
   wherein the third layer includes at least one conductive material operative to block electronic transmissions, wherein a fourth layer includes at least one conductive material operative to block electronic transmissions, or wherein both the third layer and the fourth layer include at least one conductive material operative to block electronic transmissions.

2. The thermally insulative material of claim 1, wherein the woven or non-woven material is fire-retardant.

3. The thermally insulative material of claim 1, wherein the first layer comprises a reflective polyethylene terephthalate (PET) film, a biaxially-oriented polyethylene terephthalate film, or a combination thereof.

4. The thermally insulative material of claim 1, wherein the first layer comprises a polyethylene terephthalate (PET) film.

5. The thermally insulative material of claim 1, wherein the first layer is laminated to nylon.

6. The thermally insulative material of claim 1, wherein the ultra-low thermally conductive material comprises aerogel.

7. The thermally insulative material of claim 1, wherein the foam is an open cell foam.

8. The thermally insulative material of claim 1, wherein the foam is a closed cell foam.

9. The thermally insulative material of claim 1, wherein the thermally insulative material insulates or completely or partially covers a mobile electronic device.

10. The thermally insulative material of claim 1, wherein the thermal insulative material insulates or completely or partially covers an electronic component.

11. The thermally insulative material of claim 1, wherein the thermally insulative material insulates or completely or partially covers a battery.

12. The thermally insulative material of claim 1, wherein the thermally insulative material is an arranged and attached stack of layers.

13. The thermally insulative material of claim 1, wherein the thermally insulative material is a composite layered material.

14. The thermally insulative material of claim 1, wherein the thermally insulative material is capable of reflecting thermal radiation away from a completely or partially covered electronic device or component.

15. The thermally insulative material of claim 1, wherein the thermally insulative material is capable of reflecting thermal radiation towards a completely or partially covered electronic device or component.

16. The thermally insulative material of claim 1, wherein the thermally insulative material is capable of reflecting thermal radiation away from and towards a completely or partially covered electronic device or component.

17. The thermally insulative material of claim 1, wherein the thermally insulative material is configured as a pouch, enclosure, case, container, and/or receptacle.

18. The thermally insulative material of claim 1, wherein the thermally insulative material forms a pouch, enclosure, case, pocket, container, and/or receptacle.

19. The thermally insulative material of claim 1, wherein the thermally insulative material is used in or on a garment.

20. The thermally insulative material of claim 1, wherein the at least one conductive material includes at least one of: copper, nickel, and aluminum.

21. The thermally insulative material of claim 20, wherein the at least one of: copper, nickel, and aluminum is integrated with the woven or non-woven material of the third layer.

22. The thermally insulative material of claim 1, wherein the electronic transmissions are electromagnetic fields such that the at least one conductive material is operative to block the electromagnetic fields.

23. The thermally insulative material of claim 1, wherein the at least one conductive material includes a series of thin metallic wires.

24. The thermally insulative material of claim 23, wherein the electronic transmissions are electronic waves such that the at least one conductive material is operative to block the electronic waves.

25. The thermally insulative material of 1, wherein the at least one conductive material includes a series of thin conductive filaments.

26. The thermally insulative material of claim 25, wherein the filaments are composed of at least one of: copper, silver, nickel, galvanized zinc, iron, aluminum, stainless steel, or a combination thereof.

27. The thermally insulative material of claim 1, wherein the electronic transmissions include wireless transmissions such that the at least one conductive material prohibits wireless transmissions to and from a mobile device encased within the thermally insulative material.

28. The thermally insulative material of claim 27, wherein the wireless transmission is a radio frequency signal blocked by the at least one conductive material.

29. The thermally insulative material of claim 27, wherein the wireless transmission is at least one of: a Wi-Fi signal, a Bluetooth signal, and a global positioning system signal.

30. The thermally insulative material of claim 1, wherein the third layer, the fourth layer, or both the third layer and the fourth layer, are impregnated with or coated with MXenes.

31. The thermally insulative material of claim 1, wherein the third layer, the fourth layer, or both the third layer and the fourth layer, further include at least one of: two-dimensional transition metal carbides, carbonitrides, and nitrides.

* * * * *